Figure 1:
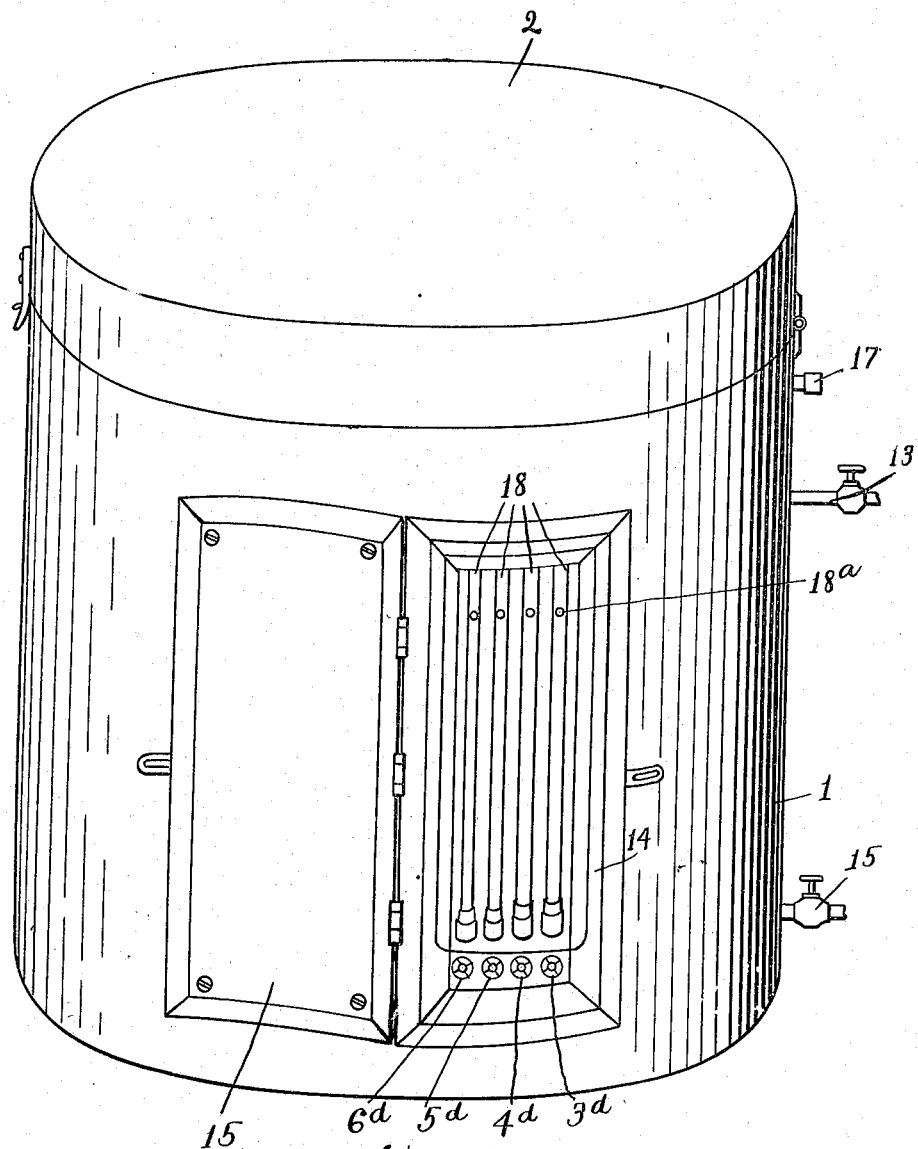

M. CHASE.
STORAGE APPARATUS FOR LIQUEFIED GAS.
APPLICATION FILED MAR. 24, 1905.

911,294.

Patented Feb. 2, 1909.
3 SHEETS—SHEET 3.

Witnesses:
H. B. Davis
Maud M. Piper

Inventor:
Milton Chase
Noyes Hamilton
Attys

UNITED STATES PATENT OFFICE.

MILTON CHASE, OF HAVERHILL, MASSACHUSETTS.

STORAGE APPARATUS FOR LIQUEFIED GAS.

No. 911,294.

Specification of Letters Patent.

Patented Feb. 2, 1909.

Application filed March 24, 1905. Serial No. 251,811.

*To all whom it may concern:*

Be it known that I, MILTON CHASE, of Haverhill, county of Essex, State of Massachusetts, have invented an Improvement in Storage Apparatus for Liquefied Gas, of which the following description, in connection with the accompanying drawings, is a specification, like characters on the drawings representing like parts.

In the storing and distribution of air after it has been reduced to liquid form the following characteristic phenomena have been observed. Liquid air may be confined in a tank having walls of sufficient strength only to confine water, provided a vent is left open, which will permit the constant escape of the vapor which continually rises from the surface of the liquid. It has been observed that this vapor produces intense cold; that is, that the rapid change of the liquid to its natural form absorbs the heat from the surrounding objects or atmosphere; the rapidity of this change depending directly on the rapidity with which heat is supplied to permit the change. It is also well known that the rapidity of the evaporation from the surface of liquefied gas in a tank or vessel depends on the amount of heat which may be supplied to the sides of the tank as well as to the surface of the liquid. Another well-known fact is that the agitation of the surface of the liquid materially increases the rapidity of evaporation as the outside heat has a greater surface on which to act, and therefore the quieter the surface of the liquid the less will be the rapidity of evaporation.

The objects of my invention are to provide an improved means for the storage of liquid air, or other liquefied gas, which will prevent loss from evaporation to the greatest possible extent, when it is used for motive power, as in automobile carriages, and the like, and when it is stored in large quantities, ready for general distribution. I accomplish these objects by providing a storage tank which is as thoroughly heat insulated, by various mechanical arrangements, as is possible, and by causing the escaping vapor to pass around all sides of the tank before it is permitted to escape, thus drawing heat from the walls of the tank and the insulating material, so that the amount of heat which may reach the liquid in the tank is reduced to a minimum. To prevent the access of heat to the surface of the liquid and to prevent the agitation thereof when the tank is being transported, I further provide a movable cover or float which rests on the surface of the liquid and tightly fits the top of the tank, the float being made so that it will be as perfect a non-conductor of heat as is feasible. To prevent circulation of the liquid in the tank so that the higher temperature of the liquid which is near the walls of the tank will not be communicated to the liquid which is near the middle thereof, I provide a series of concentrically arranged tanks or partitions, instead of a single tank, thus introducing another factor which retards evaporation.

For a more complete disclosure of my invention, reference is made to the accompanying drawings forming a part of this specification, in which:—

Figure 2:
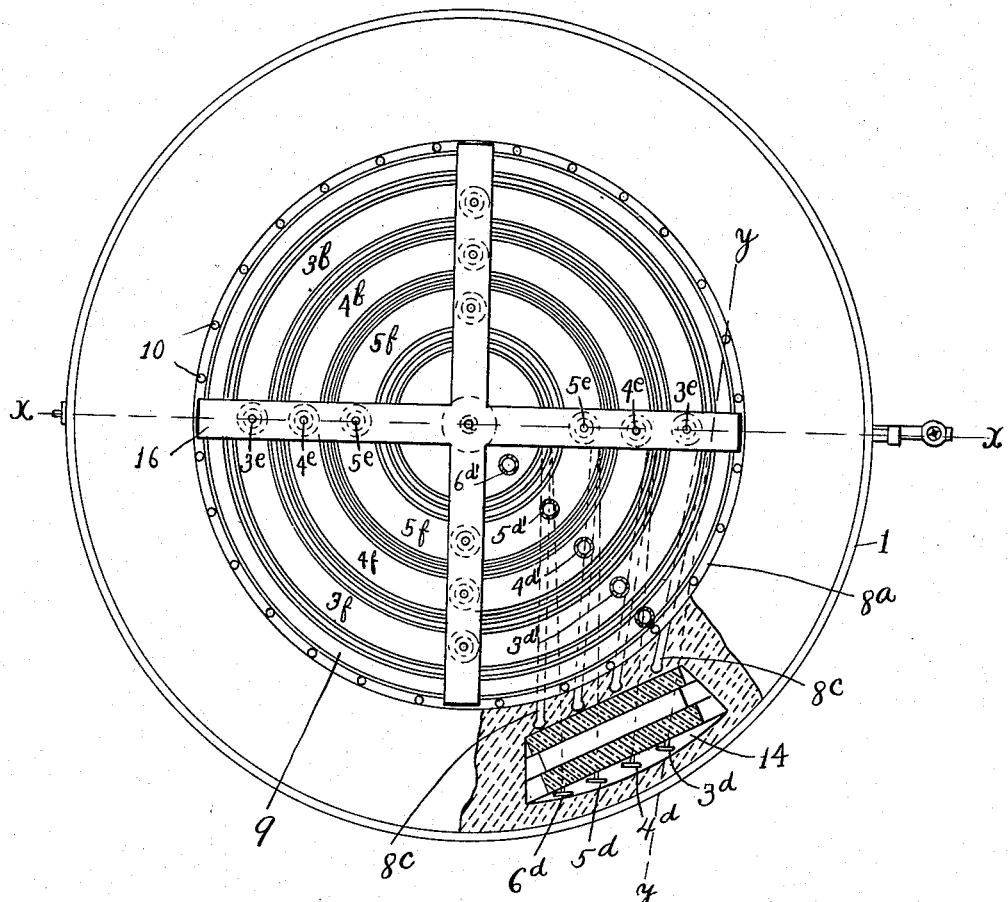
Figure 3:
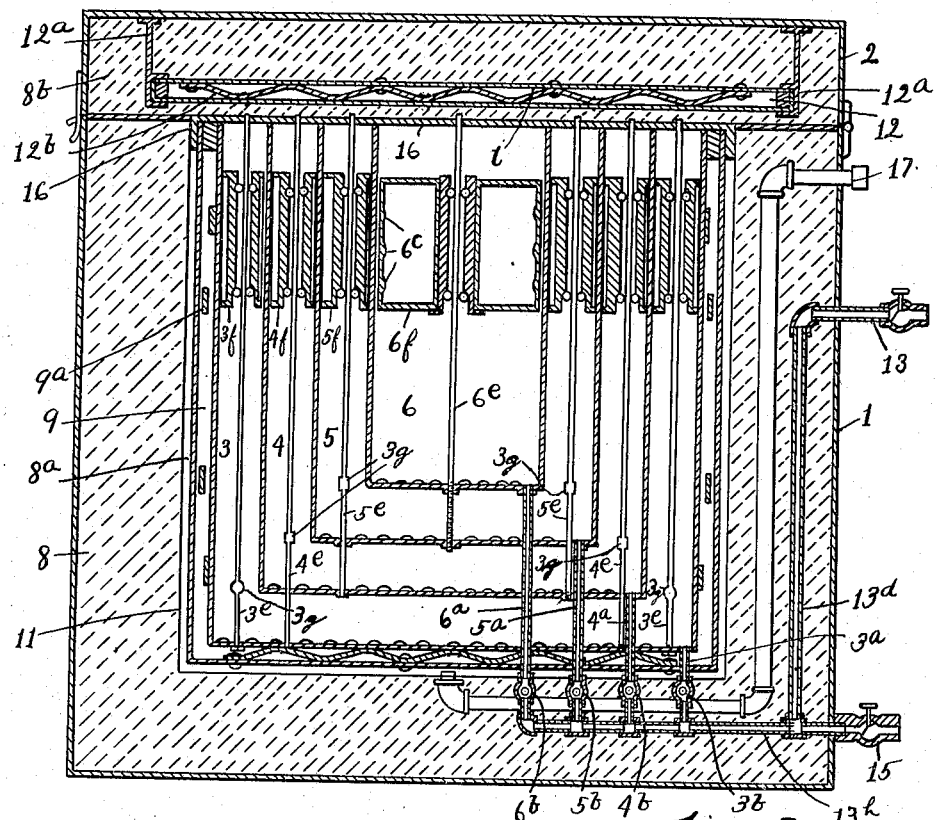
Figure 4:
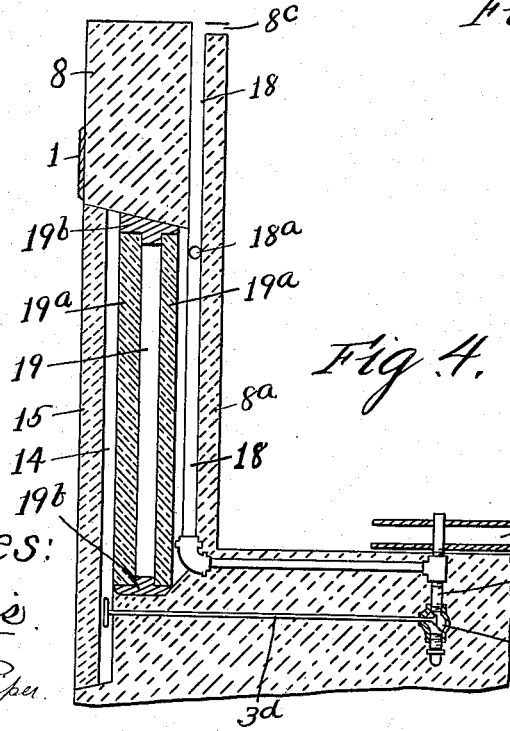

Figure 1 is a perspective view of the outer casing of my apparatus showing the door in front of the gage tubes open for inspection. Fig. 2 is a plan view, partly in section, of the apparatus shown in Fig. 1, with the cover removed. Fig. 3 is a central vertical section on the line $x$—$x$ of Fig. 2. Fig. 4 is an enlarged detail sectional view taken approximately on the line $y$—$y$ of Fig. 2.

The apparatus illustrated is especially designed to contain a large quantity of liquefied air or gas, said apparatus consisting of an outer casing 1 which is preferably cylindrical in form, and is provided with a hinged cover 2.

Numerals 3, 4, 5 and 6 indicate a series of concentrically arranged, cylindrical tanks which are located in the central part of the casing 1, each inner tank being contained completely in the next outer tank, the spaces between the respective bottoms thereof being substantially the same as the spaces between the respective side walls. A packing 8 of any suitable non-heat-conducting material is interposed between the outer casing 1 and the outer tank 3, and a vacuum chamber 9 incloses the sides and bottom of the latter. When the air is exhausted from this chamber 9, its walls are subject to a great external pressure, and to prevent the same from collapsing I provide said chamber with a series of braces consisting of strips of metal 9ª which are bent so as to extend back and forth across the chamber. The braces are suitably riveted at their points of contact with one side of the chamber and bear against the other side as shown. As the distance between the walls of the chamber is short, it would be extremely difficult to attach the braces to both walls, and by attaching the braces to one wall only, they will be equally effective. In making this chamber, the braces will be riveted to one wall, and then the two walls will be connected to an intermediate piece. The wall through which the rivets do not pass may, moreover, be made lighter than the other wall, as it will not be weakened by rivet holes.

For purposes which will presently appear I wish to provide an open space $8^a$ next the vacuum chamber 9, which is not filled by a dense packing, but which will be sufficiently open to allow the circulation of escaping vapor therethrough in preference to a circulation through the packing 8. The means shown for preventing the packing from being forced close to the walls of the chamber 9 consists simply in a series of vertical rods or tubes 10, see Fig. 2, which are arranged at intervals around the surface of the chamber 9. A wire netting 11 is stretched around the rods 10 so that a space $8^a$ is formed inside the netting in which the packing 8 is not placed. The cover 2 is also filled with a packing $8^b$, and a vacuum chamber 12 is supported by brackets $12^a$ from the inner side of the cover. The chamber 12 is of disk form, it having a somewhat greater diameter than the outer chamber 3, so that the edges thereof extend some distance beyond the side walls thereof at all points. This chamber 12 is also braced by the strips $12^b$ in the manner described with reference to chamber 9. The main inlet pipe 13 to the various tanks leads from the liquefier, or any other source of supply, and enters the outer casing at a point on a level with the highest liquid level in the tanks, and has downwardly and horizontally extending portions $13^d$ and $13^h$, as shown. A series of branch pipes $3^a$, $4^a$, $5^a$, $6^a$, lead from the horizontal portion $13^h$ to the bottom of the chambers 3, 4, 5 and 6, respectively, each branch pipe being screwed through the bottom of the tank into which it leads and through the bottoms of those below, so that they all serve as supports for the tanks through which they pass and hold them the proper distances apart. Each branch pipe is provided with a suitable valve $3^b$, $4^b$, $5^b$, $6^b$, so that by opening or closing these valves the liquid may be discharged from, or admitted into the tanks at will. The stems $3^d$, $4^d$, $5^d$, $6^d$, of each valve pass outwardly to a chamber 14 which is closed by the hinged door 15, as shown in Figs. 1 and 4.

The horizontal portion $13^h$ of the pipe 13 is connected to the discharge pipe 15 which is led to the point where the liquid is to be used. The upper end of each tank is open, the packing $8^b$ in the cover 12 being held a short distance from the upper edges thereof by the spider guide 16, which latter rests directly thereon.

The tanks 3, 4 and 5 are each provided with an annular float, plunger or piston, $3^f$, $4^f$, $5^f$, which closely fits the inner wall of the tank which contains it and the outer wall of the next inner tank. These floats are preferably made hollow, and the air is exhausted therefrom so as to make a more perfect insulation for the surface of the liquid in the tanks. The innermost chamber 6 is also provided with a hollow float $6^f$, which fits closely therein, and in which a vacuum is maintained. The walls of each of these floats may be strengthened by a series of ribs $6^c$, (indicated only inside of float $6^f$,) which extend around the inside thereof and act as supports for the walls when the air is exhausted from the float. Each float is provided with an outlet pipe, through which the air therein may be exhausted in the manner which will be obvious, the location of said pipes being indicated at $3^{d'}$, $4^{d'}$, $5^{d'}$ and $6^{d'}$ in Fig. 2. The annular floats $3^f$, $4^f$, $5^f$ are each provided with four apertures at diametrically opposite points, through which the guide rods $3^e$, $4^e$, $5^e$ pass. These guide rods are supported at their lower ends in the bottom of the tanks, and at their upper ends in the spider guide 16. Each guide is screw-threaded at its lower end and passed through the bottom of the tank which contains it and the bottom of the tank next below. As the rods are screw-threaded into the tank bottoms, they serve to support the tanks in their proper relations; nuts may be screwed on the rods, as shown, if desired, to serve as additional security. Although each float should close the space between the surface of the float and the surface of its corresponding tank as tightly as possible, it should also be free to rise and fall in the tank as the liquid is raised or lowered therein. When the liquid level sinks in a certain tank, the float also sinks to the same extent, and consequently rests on the surface of the liquid whatever the level. Stops $3^g$ may be provided on the guide rods for limiting the downward movement of the floats. As the spider guide 16 rests on the edges of the tanks, there will be an open space between the upper edge of each tank and the bottom of the packing in the cover 12, and, as the guide overhangs the upper outer edge of the vacuum chamber 9, a free connection is afforded between the tops of each tank and the space $8^a$, between the packing 8 or netting 11, and the outer surface of the vacuum chamber 9. As the guide rods pass somewhat loosely through the floats, an open vent is provided from the surface of the liquid in the tanks to the upper ends thereof, and, as there is a free connection between the upper ends of the tanks and the space 8ª between the netting and the vacuum chamber, it follows that the vapor rising from the surface of the liquid will be free to be discharged into this space 8ª and fill it. It is obviously necessary to provide some free discharge, or vent for the vapor which is discharged into the space 8ª, to the outside of the casing, and to provide this I insert the pipe 17, which enters the casing at a point above the liquid level, and is carried down through the packing to a point below the liquid level to a point directly underneath the center of the chamber 9, and also the center of the concentric tanks, and opens into the space 8ª. The pipe 17 passes directly in the rear of the inlet pipes, the packing being shown as removed to show the same in Fig. 3, for convenience in illustration. The vapor which rises from the surface of the liquid will therefore pass around the walls of the vacuum chamber 9 and be discharged at a point as remote as possible from the point at which it rises from the liquid. This vapor may be conducted to the liquefier to be used in cooling the gas as it is condensed into liquid form or used for any other purposes which may be desired.

In order that it may be readily ascertained how much liquid each receptacle contains, I provide a series of gage tubes 18 shown in Figs. 1 and 4. The bottoms of these tubes are connected to the pipes 3ª, 4ª, 5ª, 6ª, respectively, at a point above the valves 3ᵇ, 4ᵇ, 5ᵇ, 6ᵇ, as shown in Fig. 4, the packing being cut away to show a tube and its connection to an inlet pipe, for convenience in illustration. Each tube is provided with a colored ball 18ª which rests on the surface of the liquid in the tube. It is desirable to make this ball of a non-heat conducting material, so that the possibility of heat reaching the surface of the liquid in the tube will be reduced to a minimum, and it is also desirable to have the balls fit the tubes as tightly as possible without sticking, or obstructing the necessary escape of vapor from the tops of the tubes. The upper end of the tube preferably terminates a short distance below the top of packing 8, and laterally extending passages 8ᶜ connect the tops of said tubes with space 8ª, see Figs. 2 and 4, permitting the discharge of the vapor rising from the tube into this space, and causing the vapor to circulate about the vacuum chamber in the same manner as previously described. In front of the gage tubes 18 I provide a vacuum chamber 19 which is composed of two heavy glass walls 19ª which are held apart by the hard rubber packing 19ᵇ. In front of the vacuum chamber is a door 15, see Figs. 1 and 4, which is suitably packed as shown. When it is desired to inspect the gage tubes or manipulate the valves, the door is opened, as shown in Fig. 1. The formation of frost on the gage tubes, which would prevent the balls 18ª from being seen, is prevented by the vacuum chamber 19, and as the walls thereof are transparent the height of the liquid therein may be readily ascertained.

Having pointed out the mechanical features of my apparatus, I will describe its manner of use, and refer more particularly to the advantages possessed by the same. The liquid will be introduced at the pipe 13, and each tank will be filled approximately to the point indicated by the bottoms of the floats in Fig. 3. When these tanks are filled, the valves 3ᵇ, 4ᵇ, 5ᵇ, 6ᵇ, will be closed until it is desired to discharge some of the liquid through the pipe 15. When it is desired to use the liquid, the valve controlling the outer chamber 3 will preferably be opened first, permitting the liquid to pass into the pipe 15, as will be obvious. While the liquid is held in storage, the vapor will continually rise from the surface thereof, and will circulate around about the tanks and out through the vent pipe 17. As the vapor expands about the chamber 9, it will absorb the heat from the surrounding objects, and produce a stratum of air at a very low temperature between the tanks and packing, which will tend to make the confined liquid even colder than it was before, so that the amount of evaporation therein will be materially reduced. The floats rest upon the surface of the liquid and thus prevent evaporation which might be caused either by agitation of the surface of the liquid if the apparatus should be moved, or by access of heat to the surface of the liquid. As the liquid is used from each receptacle in turn, the floats will each drop, following the surface of the liquid in a manner which will be obvious, so that the surface of the liquid will always be insulated and agitation of the surface will, at all times, be prevented.

The object of providing the concentric tanks, or series of tanks, one of which is contained by another, is to prevent the circulation of the liquid from one part of the vessel to another; that is, the outer tank being nearer the source of heat than the inner tank which is next thereto, the temperature of the liquid in each receptacle will be different, and that in the inner tank will be much lower than that in the outer tank. The evaporation from the inner tank will therefore be much less than the evaporation from the outer tank, and, as there is no chance for circulation between the tanks, the higher temperature of the liquid in the outer tank cannot be communicated to the inner tank by circulation. After the liquid has been exhausted from the outer tank, the latter will be filled with vapor which will insulate the inner tanks in the same manner as the chamber 8ª insulates the outer tank.

The subject matter of this application has been the subject matter of two other applications filed by me to wit:—Serial No. 734,320, filed October 21, 1899, and Serial No. 179,129 filed October 30, 1903.

Having thus described my invention, what I claim as new and desire to secure by Letters Patent is:—

1. An apparatus for the storage of liquefied gas consisting of a series of tanks arranged one within the other, each inner tank being completely contained by the next outer tank, a non-heat conducting chamber surrounding the outermost tank, a separate pipe connected to each tank near the bottom thereof, means for controlling the flow of liquid therethrough and a common discharge pipe connected to each of said pipes, said tanks being disconnected except through said pipes whereby flow from one tank to another is prevented, and each of said tanks may be discharged irrespective of the other, substantially as described.

2. An apparatus for the storage of liquefied gas consisting of a tank, an insulating vacuum chamber therefor, a series of braces in said chamber consisting of one or more strips of metal bent so as to bear alternately against the opposite walls thereof, and means for securing said strips at the points of contact with one wall only, substantially as described.

3. An apparatus for the storage of liquefied gas, consisting of a tank, a gage tube connected thereto, a float carried on the surface of the liquid in said tube to indicate the liquid level therein, said tube having a vent above the highest liquid line therein, a heat insulating chamber surrounding said tank and a vacuum chamber having transparent sides arranged in front of said tube, substantially as described.

4. An apparatus for the storage of liquefied gas, consisting of a tank open at its top, a non-heat conducting packing surrounding said tank, a cover containing a packing arranged over said tank, a vacuum chamber arranged in the packing of said cover a short distance above and directly over the top of said tank, and brackets connecting said cover and chamber, said chamber extending beyond the walls of said tank, substantially as described.

In testimony whereof, I have signed my name to this specification, in the presence of two subscribing witnesses.

MILTON CHASE.

Witnesses:
L. H. HARRIMAN,
H. B. DAVIS.